United States Patent
Carlson

(10) Patent No.: US 6,769,516 B2
(45) Date of Patent: Aug. 3, 2004

(54) OIL CONTAINMENT BOOT AND METHOD OF USING SAME

(76) Inventor: Ronald C. Carlson, 10576 Alison Way, Inver Grove Heights, MN (US) 55077

(*) Notice: Subject to any disclaimer, the term of this patent is extended or adjusted under 35 U.S.C. 154(b) by 0 days.

(21) Appl. No.: 10/065,182

(22) Filed: Sep. 24, 2002

(65) Prior Publication Data
US 2004/0055827 A1 Mar. 25, 2004

(51) Int. Cl.⁷ .............................. F16C 1/24
(52) U.S. Cl. .................. 184/1.5; 184/106; 141/86; 141/331
(58) Field of Search ............... 184/1.5, 106; 141/86, 141/331, 340, 343; 210/248

(56) References Cited

U.S. PATENT DOCUMENTS

| | | | | |
|---|---|---|---|---|
| 4,020,922 A | | 5/1977 | Klasel ..................... 184/1.5 |
| 4,376,703 A | * | 3/1983 | Krauss ..................... 184/1.5 |
| 4,451,368 A | * | 5/1984 | Pandelena et al. .......... 210/248 |
| 4,492,632 A | | 1/1985 | Mattson .................... 210/168 |
| 4,867,017 A | | 9/1989 | Holman ................... 81/121.1 |
| 4,964,330 A | | 10/1990 | Swinney et al. .............. 81/64 |
| 5,101,868 A | * | 4/1992 | Balch ......................... 141/86 |
| 5,169,541 A | * | 12/1992 | Wells ........................ 210/248 |
| 5,271,299 A | | 12/1993 | Wadsworth ............... 81/121.1 |
| 5,307,712 A | | 5/1994 | Pratt ........................... 81/64 |
| 5,374,355 A | * | 12/1994 | Habiger et al. ............. 210/440 |
| 5,454,960 A | | 10/1995 | Newsom ................... 210/805 |
| 5,469,935 A | | 11/1995 | Hewuse ...................... 184/1.5 |
| 5,598,951 A | | 2/1997 | DeBano, Jr. ................. 222/83 |
| 5,623,755 A | * | 4/1997 | Childress et al. ........... 210/248 |
| 5,655,624 A | | 8/1997 | Kelly, Jr. .................... 184/1.5 |
| 5,762,671 A | * | 6/1998 | Farrow et al. ............... 55/496 |
| 5,857,503 A | * | 1/1999 | Vreeken .................... 184/1.5 |
| 6,033,578 A | | 3/2000 | Loewen ..................... 210/767 |
| 6,056,874 A | | 5/2000 | Goodman ................... 210/248 |
| 6,214,215 B1 | * | 4/2001 | Berkey et al. .............. 210/130 |
| 6,227,078 B1 | | 5/2001 | Lemmo, Jr. ................. 81/121.1 |
| 6,401,574 B1 | | 6/2002 | Myers ....................... 81/121.1 |

* cited by examiner

Primary Examiner—Timothy P McAnulty
(74) Attorney, Agent, or Firm—Larkin Hoffman Daly & Lindgren Ltd.; Thomas J. Oppold, Esq.

(57) ABSTRACT

An oil containment boot to prevent oil spillage during removal of inverted oil filter canisters and method of using same. The oil containment boot includes a peripheral side wall defining an open top end and an open bottom end. The open bottom end of the boot is operably sealingly secured over the oil filter receiving base such that the peripheral side wall extends upwardly a distance above the oil filter receiving base to surround at least the lower portion of the inverted oil filter canister. Upon removal of the inverted oil filter canister from the oil filter receiving base through the open top end, any oil in the inverted oil filter canister is contained within the peripheral side wall of the boot.

6 Claims, 5 Drawing Sheets

OIL CONTAINMENT BOOT AND METHOD OF USING SAME

BACKGROUND OF INVENTION

1. Field of the Invention

The present invention relates generally to devices for preventing oil spillage during removal of oil filter canisters from engines, and more particularly to an oil containment device for preventing oil spillage during removal of inverted oil filter canisters from engines wherein the return oil opening in the filter canister is oriented in the downward position in opposition to the upwardly projecting oil return fitting of the filter receiving base.

2. Description of the Related Art

Various oil containment devices have been proposed to prevent oil spillage during the removal of oil filter canisters from engines. Examples of some of these devices are disclosed in U.S. Pat. Nos. 4,020,922; 4,867,017; 5,271,299; 5,454,960; 5,469,935; 5,598,951; 5,623,755; 5,655,624; 6,033,578; 6,056,874; 6,222,078 and 6,401,574. Most of the oil containment devices disclosed in these references are for use with engines having filter fittings located in the conventional manner at the bottom of the engine such that the opening in the filter canister is oriented in the upward position in opposition to the downwardly projecting filter fitting. Thus, in this conventional arrangement, the oil containment devices of the above cited references are disposed below the engine block such that upon removal of the oil filter, any remaining waste oil not otherwise drained out through the oil pan drain plug, drains out through the engine's bottom mounted, downwardly oriented, filter fitting and into the oil containment device below. Of the above cited references, U.S. Pat. Nos. 5,454,960; 5,623755 and 5,655,624 disclose oil containment devices for use with engines having side mounted filter fittings such that the oil return opening in the filter canister is oriented substantially horizontal in opposition to the substantially horizontal filter fitting. Similarly, however, these three references disclose that the oil containment devices are disposed below the side mounted oil filter canisters such that upon their removal, any remaining waste oil drains out through the engine's side mounted, substantially horizontal filter fitting and into the oil containment device below.

While the oil containment devices disclosed in the above cited references may each serve their intended purpose, they are incapable of performing their intended function when the filter fitting or filter receiving base is oriented in the upward direction so as to receive an inverted filter canister with its oil return opening oriented in the downward direction (hereinafter referred to as an "inverted oil filter canister").

Inverted oil filter canisters operably mounted above or adjacent to the engine's crank case have recently become prevalent in the marine or boating industry to enable greater ease of access to the oil filter from above the engine block. It should be appreciated that due to the tight confinement of marine engines within the substantially enclosed hulls of boats, it is usually exceedingly difficult to access the oil filter canister for removal and installation when it is mounted in the conventional manner near the bottom or on the side of the engine block. Thus, many boat engine manufacturers or suppliers have begun to install "remote filter" kits or oil filter adaptors to the engine blocks of marine engines so the oil filter canisters can be more easily accessed from above. Furthermore, for ease of accessibility, the oil filter canisters are typically inverted so that the servicing mechanic can easily grasp the top of the filter canister for threadably removing and installing the filter canister onto the upwardly oriented filter fitting or filter receiving base.

While the use of inverted oil filter canisters positioned in the engine compartment of a boat or other vehicle for access from above the engine block improves ease of access during servicing of the engine, inverting the oil filter canister such that the oil return opening is disposed downwardly inevitably results in increased oil spillage during its removal. It should be appreciated that upon removing an inverted oil filter from a filter fitting or receiving base, air enters the filter through its oil inlet ports displacing the oil contained within the canister, thereby causing the oil to flow out of the bottom oil return opening of the inverted filter canister. While some of the waste oil may flow back down into the opening in the filter fitting or receiving base, the majority of the oil will unfortunately spill out over the filter fitting or receiving base where it will drip down onto other engine components and eventually onto the floor or ground causing other engine components to become soiled and leaving stains and slipping hazards on the garage floor or ground. If the inverted filter is being used on a boat, the spilled oil will eventually pool at the bottom of the boat hull or bilge where it has to then be siphoned or wiped out with rags. It should be appreciated that if the waste oil in the bilge is not wiped out, the float activated bilge pump will discharge the waste oil overboard into the lake or river along with any water or other fluids in the bilge. This would not only negatively impact the environment, but it may also subject the boat owner to fines.

Accordingly, there is a need for an oil containment device for preventing oil spillage during removal of inverted oil filter canisters to minimize cleanup during servicing of an engine. It would be desirable to provide such a device that will not only contain the oil to prevent oil spillage, but also to direct the oil back into the engine crank case for drainage along with the rest of the waste oil, thereby eliminating the environmental concerns identified above. Such a device would also minimize disposal concerns of oil-soaked rags, increase the amount of used oil that can be captured and recycled and would minimize labor, time and expense in servicing of the engine.

SUMMARY OF INVENTION

The present invention is an oil containment boot to prevent oil spillage during removal of inverted oil filter canisters and method of using same. The oil containment boot is preferably comprised of a funnel shaped peripheral side wall defining an open top end and an open bottom end. The open bottom end of the boot is operably sealingly secured over the oil filter receiving base such that the peripheral side wall extends upwardly a distance above the oil filter receiving base to surround at least the lower portion of the inverted oil filter canister. Upon removal of the inverted oil filter canister from the oil filter receiving base through the open top end, any oil in the inverted oil filter canister is contained within the peripheral side wall of the boot. The waste oil contained within the boot is directed back into the opening in the filter fitting or oil filter receiving base such that the waste oil draining from the inverted oil filter can be drained along with the rest of the waste oil from the engine crank case, thereby eliminating oil spillage, minimizing cleanup, and the necessity of a separate waste oil collecting pan.

To the accomplishment of the above objectives, features and advantages, this invention may be embodied in the forms illustrated in the accompanying drawings, attention being called to the fact, however, that the drawings are illustrative only, and that changes may be made in the specific form illustrated and described within the scope of the appended claims.

DETAILED DESCRIPTION

Figure 1:
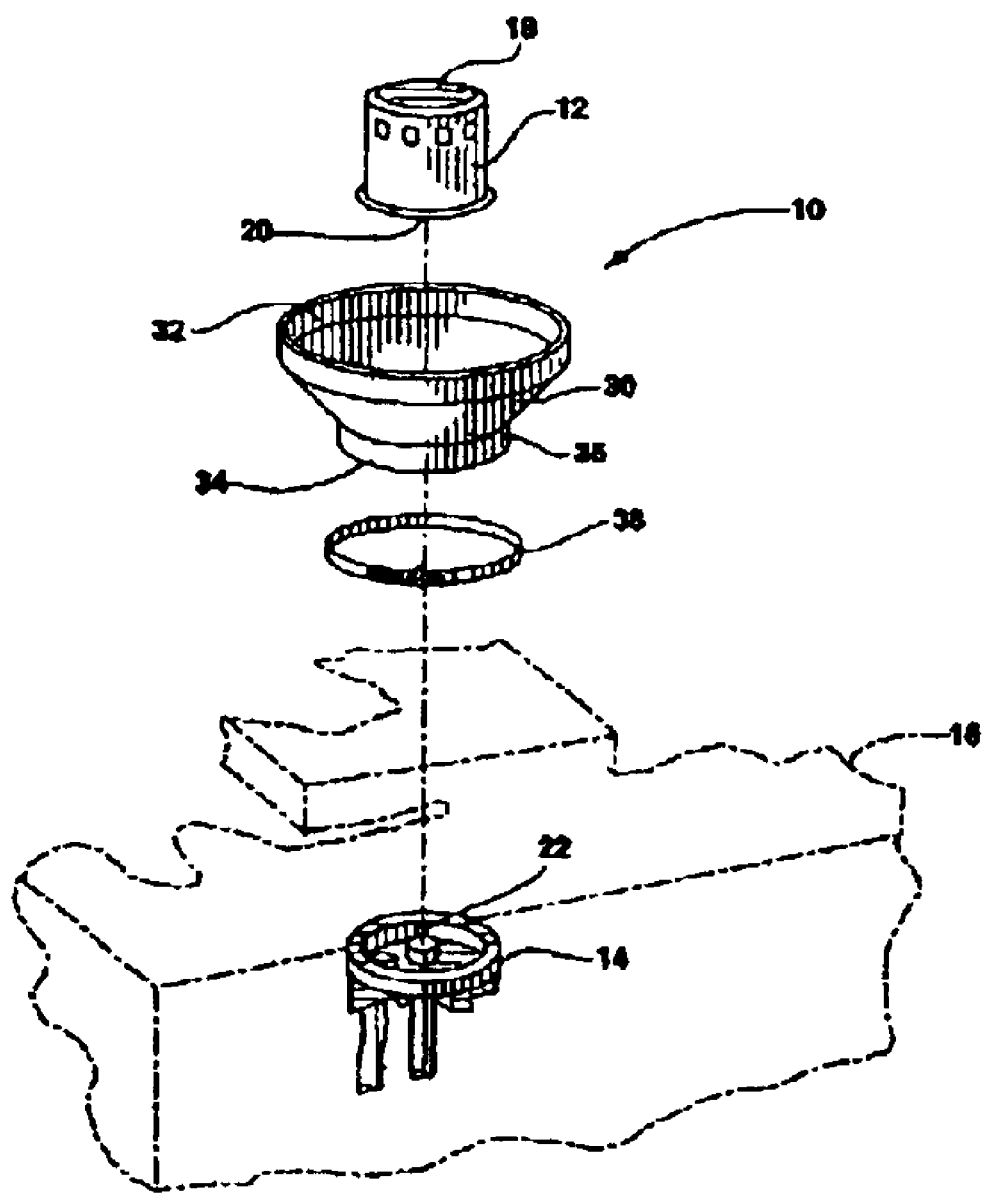
FIG. 1 is an exploded perspective view showing the installation of the preferred embodiment of the oil containment boot of the present invention on an oil filter receiving base.

Referring to drawing FIG. 1, the preferred embodiment of the oil containment boot 10 of the present invention is shown for use with an inverted oil filter canister 12 receivably mounted to an oil filter receiving base 14 for an engine 16.

As used herein, the term inverted oil filter canister 12 refers to any oil filter canister that is oriented such that the sealed portion 18 of the canister 12 is directed substantially vertically upwardly and the oil return opening 20 (FIG. 4) at the bottom of the canister 12 is directed substantially vertically downwardly as shown in FIG. 1. The term oil filter receiving base 14 should be understood as meaning any structure adapted to receive an inverted oil filter canister 12. Typically, such oil filter receiving bases 14 will be mounted in the engine compartment of a boat or other vehicle such that the oil filter canister 12 is accessible from above the engine block 16, but it should be understood that the present invention is not limited to such "top-mounted" applications. Rather, it is only necessary that the oil filter receiving base 14 includes a threaded oil return fitting 22 projecting substantially vertically upwardly onto which the oil return opening 20 of the inverted oil filter canister 12 threadably mounts as shown in FIG. 1. As such, although FIG. 1 illustrates an oil filter receiving base remote from the engine block, such as when utilizing an oil filter adaptor or remote oil filter kit as described above, the invention is not limited for use with remote filter kits or oil filter adaptors.

Continuing to refer to FIG. 1, the oil containment boot 10 includes a peripheral side wall 30 defining an open top end 32 and an open bottom end 34. The boot 10 is preferably funnel shaped and formed of a polymeric material with the open bottom end 34 sized to be slightly larger than the oil filter canister 12 and the oil filter receiving base 14. The open top end 32 is preferably substantially larger in size than the open bottom end such that there is sufficient distance between the top portion of the filter canister 12 and the upper portion of the peripheral side wall 30 to enable at least the top portion of the filter canister 12 to be grasped by a tool or by hand for threadably removing or installing the filter canister onto the oil filter receiving base 14. In an alternative embodiment discussed below, the lower portion of the peripheral side wall 30 of the boot 10 may be made of an elastomeric polymer material with the open bottom end 34 substantially smaller in size than the oil filter canister 12 and oil filter receiving base 14 such that the bias of the elastomeric material sealingly secures the open bottom end 34 operably over the oil filter receiving base 14.

In the preferred embodiment, the boot 10 further preferably includes a restraint proximate the open bottom end 34 for sealingly securing the open bottom end 34 directly around the oil filter receiving base 14. In the preferred embodiment, the restraint comprises an annular flange 36 for receiving a circumferential hose clamp 38. In an alternate embodiment, rather than a hose clamp, an adhesive may be used to sealingly secure the open bottom end 34 of the boot 10 over the oil filter receiving base 14. Alternatively, the restraint may comprise an elastomeric band to bias the open bottom end 34 of the boot 10 over the oil filter receiving base 14. In yet another embodiment as discussed above, the restraint may simply comprise an elastomeric polymer material from which at least a bottom portion of the peripheral side wall 30 is formed. In this alternative embodiment, the open bottom end 34 may be substantially smaller in size than the oil filter canister 12 and oil filter receiving base 14 such that the open bottom end 34 has to be stretched over the oil filter canister and receiving base, whereby, upon release, the bias of the elastomeric material sealingly secures the open bottom end 34 over the oil filter receiving base 14.

Figure 2:
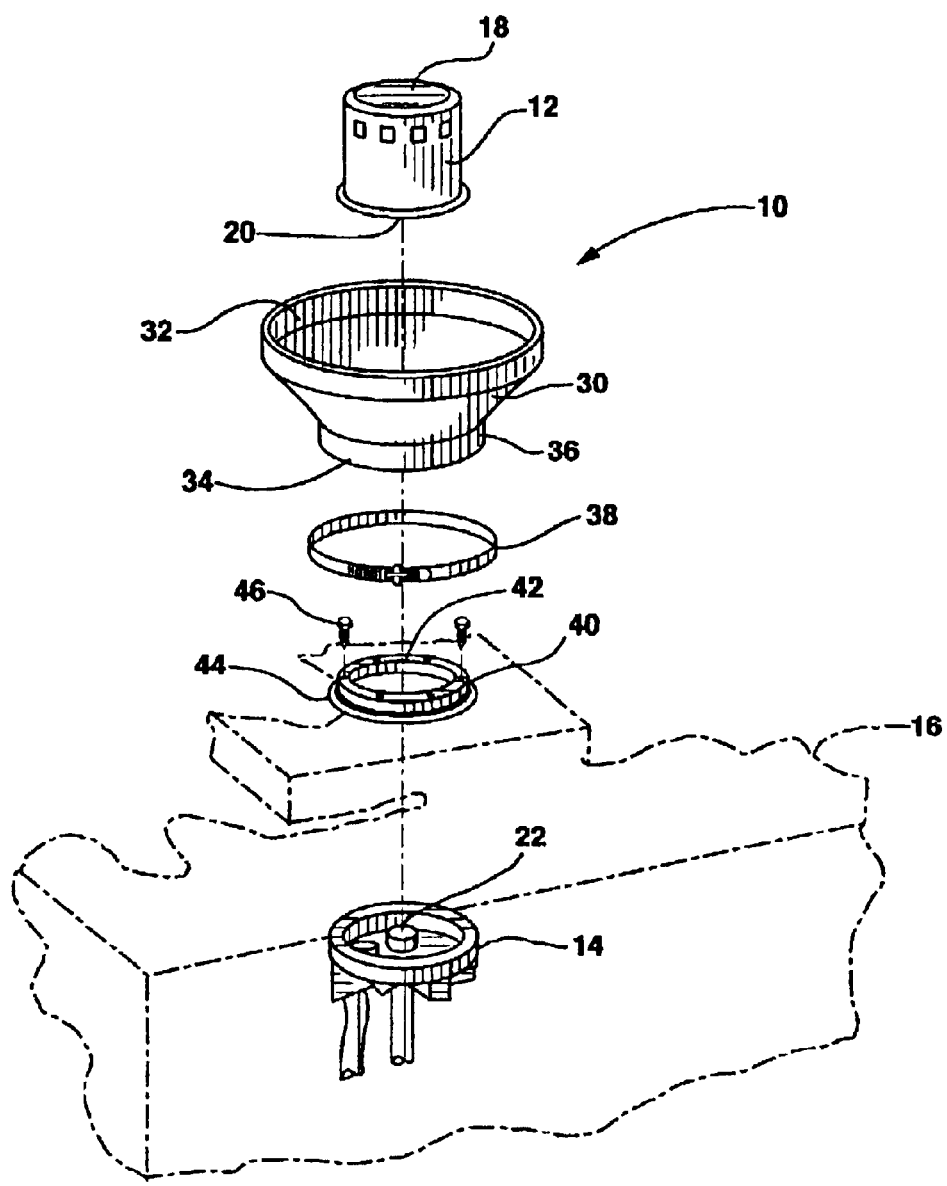
FIG. 2 is an exploded perspective view showing an embodiment of the present invention illustrating the use of an adaptor.

In certain applications, the oil filter receiving base 14 may not include any structure over which the open bottom end 34 may be sealingly secured, or the structure may be such that a fluid tight seal may not be formed. Thus, as shown in FIG. 2 it may be necessary to provide an adaptor 40 that mounts onto or over the oil filter receiving base 14. It should be appreciated that various types or configurations of adaptors 40 are possible depending on the location or configuration of the oil filter receiving base 14. As shown in FIG. 2, one embodiment of an adaptor 40 may comprise a peripheral rim 42 over which the open bottom end 34 of the boot 10 sealingly secures. An annular flange 44 may be provided for sealingly securing the adaptor 40 over the oil filter receiving base 14, for example, by tapping screws 46 (as shown), clamps, threaded connectors, adhesive, or by any other conventional means within the knowledge of one skilled in the art. In another embodiment, depending on the location and configuration of the oil filter receiving base 14, the adaptor 40 may simply comprise an extension which has a bottom end adapted to fit over the oil filter receiving base 14 and a top end adapted to receive an oil filter canister 10. For example, the extension may be a sealed cylindrical canister having a central oil return passageway extending therethrough and a plurality of oil inlet ports extending therethrough. The bottom end of the central passageway may have a female threaded opening to receive the upwardly projecting filter fitting of the oil filter receiving base 14. The top end of the extension may have an upwardly projecting male filter fitting 22 adapted to be threadably received by the threaded oil return opening of the inverted oil filter canister 12. Various other adaptor embodiments are within the knowledge of an ordinary skilled artisan and therefore further discussion of the various types of suitable adaptors to which the boot 10 may be secured is not warranted.

It should be appreciated that the various embodiments described above for sealing securing the open bottom end 34 of the boot 10 over the oil filter receiving base 14 are equally applicable for the arrangement in which an adaptor 40 is required. However, instead of sealing securing the open bottom end 34 of the boot directly over the oil filter receiving base 14, the bottom opening 34 is sealingly secured over the adaptor 40, which is in turn sealingly secured to the oil filter receiving base 14.

Figure 3:
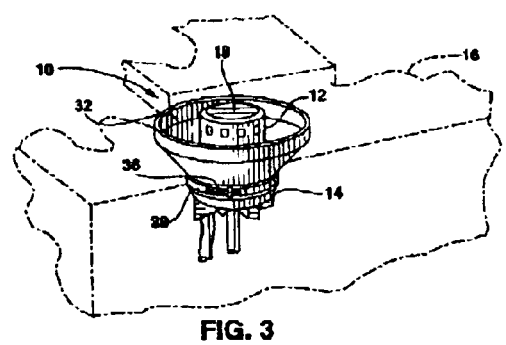
FIG. 3 is a perspective view showing the preferred embodiment of the oil containment boot of the present invention in the first oil containment position with the oil filter canister not yet removed.
Figure 4:
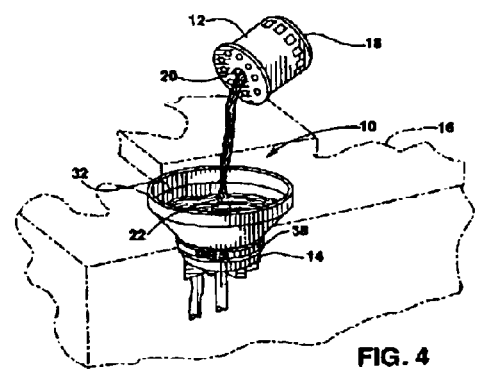
FIG. 4 is a perspective view showing the preferred embodiment of the oil containment boot of the present invention in the first oil containment position with the oil filter canister removed.

In use, as shown in FIGS. 1 and 3 the boot 10 is placed over the oil filter canister 12 disposed on the oil filter receiving base 14. The open bottom end 34 of the boot 10 is then sealingly secured over the oil filter receiving base 14. As described above and as shown in FIG. 2, in certain applications, an adaptor 40 may be required onto which the open bottom end 34 of the boot 10 is sealingly secured. The oil filter canister 12 is then removed from the oil filter receiving base 14 through the open top end 32 of the boot 10. Any oil remaining in the oil filter canister 12 is allowed to drain into the boot 10 as shown in FIG. 4. Since the open bottom end 34 of the boot 10 is operably sealingly secured over the oil filter receiving base 14, any used oil contained within the peripheral side wall 30 of the boot drains back into the engine through the filter fitting 22 for removal through the oil drain plug in the oil pan (not shown) along with the rest of the used oil in the engine's crank case.

Thus, by use of the present invention, oil spillage is eliminated thereby minimizing the amount of clean-up time, labor and expense in servicing engines. Furthermore, by use of the present invention, the need for oil rags to wipe up spills is minimized, thereby reducing the hazards and disposal concerns associated with oil-soaked rags. Furthermore, by use of the present invention, the amount of used oil captured from the engine is increased thereby improving recycling of waste oil and conserving natural resources. Furthermore, by using the present invention oil contamination of the ground or water due to oil spillage is minimized. Finally, by using the present invention when servicing boat engines, environmental concerns associated with waste oil being discharged into the water by the boat's bilge pump is eliminated since the boot prevents waste oil from spilling into the bilge.

Figure 5:
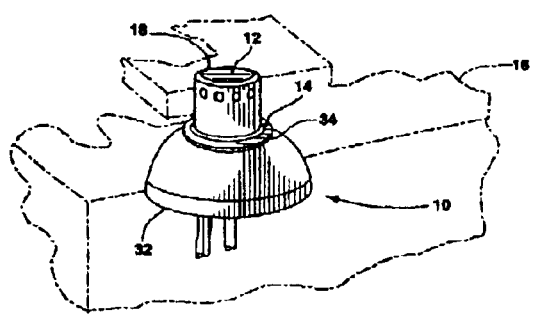
FIG. 5 is a detailed perspective view showing the preferred embodiment of the oil containment boot of the present invention in the second folded position.

Once installed, the oil containment boot may remain on the oil filter receiving base 14 or it may be installed and removed each time the engine oil filter canister 12 is replaced. However, to avoid the necessity of having to remove the boot 10 each time the engine is serviced, the oil containment boot 10 is preferably formed of polymeric material so that the boot can be moved between a first oil containment position as shown in FIGS. 3 and 4 and a second folded position as shown in FIG. 5. The ability to fold down the side walls 30 of the boot 10 is beneficial in that it allows easier installation of the oil filter canister. Additionally, by folding the side wall 30 of the boot 10 down, it avoids the potential for collecting particles, debris or water around the inverted filter canister 12 which would then have to be siphoned, vacuumed or cleaned out prior to removal of the inverted oil filter canister 12 in order to avoid the potential for these foreign materials falling into or draining down into the engine's crank case along with the waste oil draining from the removed filter canister.

Although only certain exemplary embodiments of the invention have been described in detail above, those skilled in the art will readily appreciate that many modifications are possible without materially departing from the novel teachings and advantages of this invention. Accordingly, all such modifications are intended to be included within the scope of this invention as defined in the following claims.

What is claimed is:

1. In combination with an inverted oil filter canister disposed on an oil filter receiving base of an engine block, an oil containment boot to prevent oil spillage upon removal of the inverted oil filter canister from the oil filter receiving base, said oil containment boot comprising:

a peripheral side wall defining an open top end and an open bottom end, said peripheral side wall extending substantially vertically upwardly a distance adjacent the inverted oil filter canister and in a direction away from the oil filter receiving base such that at least a portion of the inverted oil filter canister disposed on the oil filter receiving base is surrounded by said peripheral side wall;

means for sealingly securing said open bottom end of the oil containment boot operably over the oil filter receiving base such that the oil containment boot will remain sealingly secured to the oil filter receiving base while the inverted oil filter canister is removed therefrom;

whereby, upon removal of the inverted oil filter canister from the oil filter receiving base through said open top end, draining from the removed inverted oil filter canister is contained within said peripheral side wall of the oil containment boot sealingly secured over the oil filter receiving base, thereby preventing oil spillage, and whereby the oil that drains from the inverted oil filter canister contained by the boot drains back into the engine block through said oil filter receiving base.

2. The oil containment boot of claim 1 wherein at least a portion of said open top end is substantially greater in diameter than said open bottom end.

3. The oil containment boot of claim 1 wherein said peripheral side wall is moveable between a first oil containment position and a second folded position.

4. A method of minimizing oil spillage during removal of a used inverted oil filter canister from an oil filter receiving base on an engine block, said method comprising the steps of:

(a) providing a used inverted oil filter canister disposed on an oil filter receiving base;

(b) providing an oil containment boot, said boot comprising a peripheral side wall defining an open top end and an open bottom end;

(c) placing said open bottom end of said oil containment boot over said used inverted oil filter canister disposed on said oil filter receiving base;

(d) providing means for sealingly securing said open bottom end of said boot operably over said oil filter receiving based, wherein said peripheral side wall of said boot extends substantially vertically upwardly a distance adjacent the used inverted oil filter canister and in a direction away from said oil filter receiving base such that at least a portion of said peripheral side wall of said boot surrounds at least a portion of said used inverted oil filter canister disposed on said oil filter receiving base;

(e) removing said used inverted oil filter canister from said oil filter receiving base through said open top end of said boot sealingly secured over said oil filter receiving base;

whereby upon removal of said used inverted oil filter canister from said oil filter receiving base, oil draining from said removed used inverted oil filter canister is contained within said peripheral side wall of said boot which remains sealing secured operably over said oil filter receiving base thereby preventing oil spillage, and whereby the oil that drains from said removed used inverted oil filter canister contained by the boot drains back into the engine block through said oil filter receiving base.

5. The method of claim 4 wherein at least a portion of said open top end of said boot is substantially greater in diameter than said open bottom end.

6. The method of claim 4 further comprising the steps of moving said peripheral side wall between a first oil containment position during removal of said used inverted oil filter canister and a second folded position after installing a new inverted oil filter canister.

* * * * *